C. A. LIEB.
SPRING.
APPLICATION FILED DEC. 10, 1906. RENEWED AUG. 3, 1908.
945,336.
Patented Jan. 4, 1910.
2 SHEETS—SHEET 1.
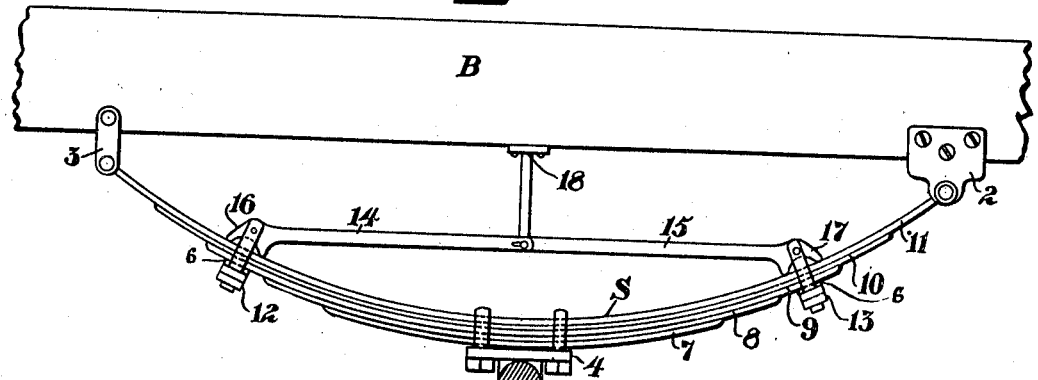
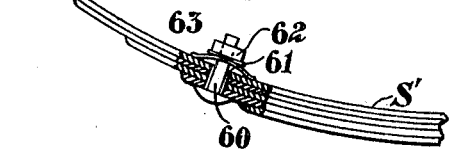
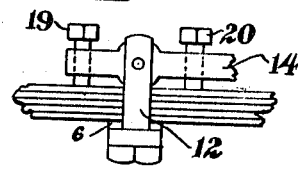
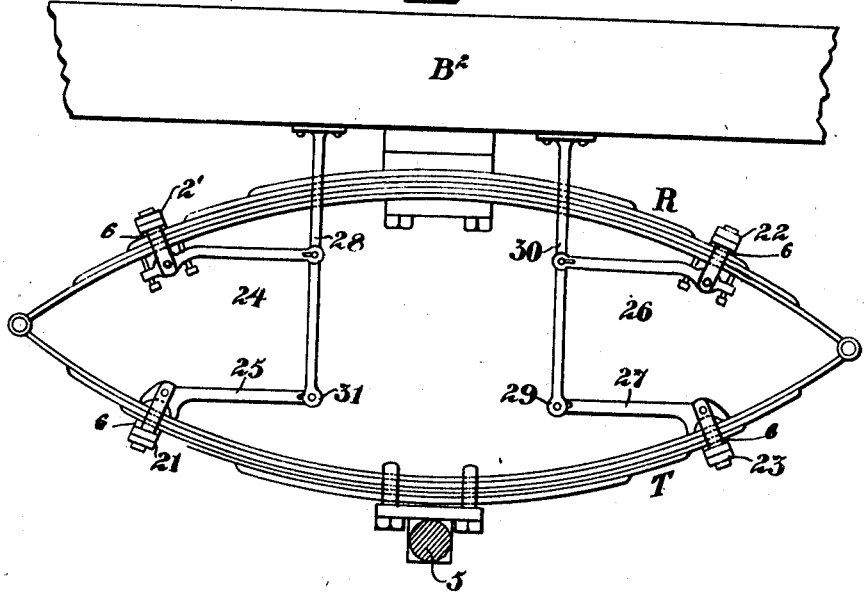
Witnesses
Inventor
Charles A. Lieb.
By his Attorney
F. H. Richards.

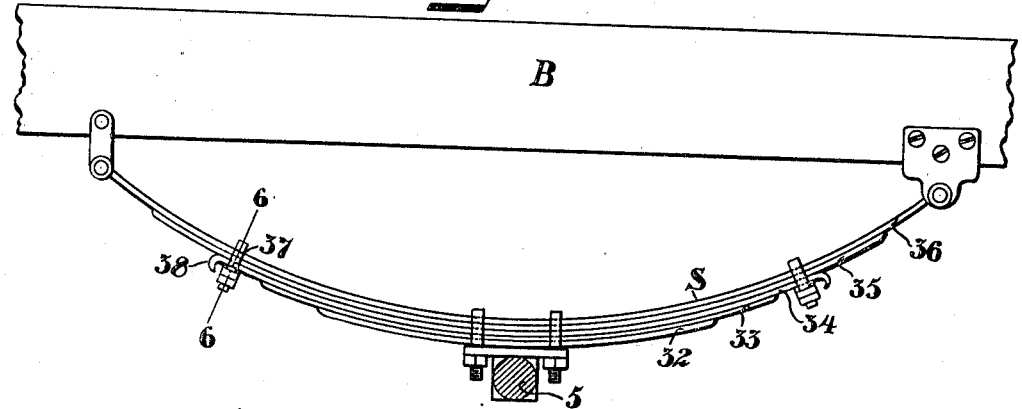
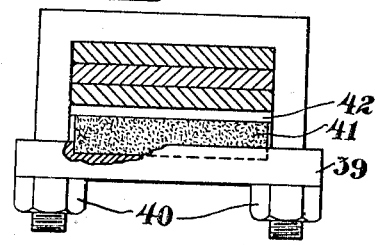
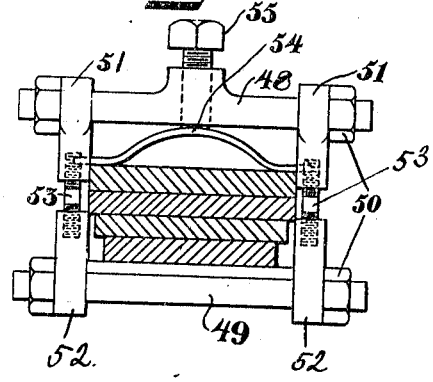
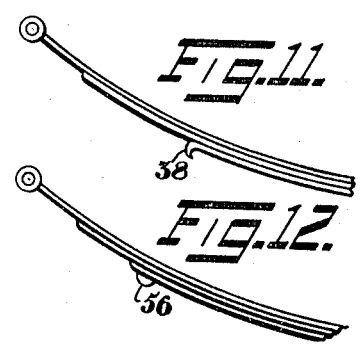

UNITED STATES PATENT OFFICE.

CHARLES A. LIEB, OF NEW YORK, N. Y.

SPRING.

945,336.   Specification of Letters Patent.   Patented Jan. 4, 1910.

Application filed December 10, 1906, Serial No. 347,225. Renewed August 3, 1908. Serial No. 446,778.

*To all whom it may concern:*

Be it known that I, CHARLES A. LIEB, a citizen of the United States, residing in New York city, in the county of New York and State of New York, have invented certain new and useful Improvements in Springs, of which the following is a specification.

This invention relates to means for automatically increasing the strength of a spring or its resistance to flexure as the spring is flexed in one or both directions from its normal position by reason of increased weight or pressure being applied on the spring.

The invention is especially applicable when a large increase of weight or pressure is suddenly applied tending to very quickly flex the spring, and also when such pressure is suddenly relieved to prevent the sudden reaction or rebound of the spring, producing violent swinging of the supporting member.

The invention is applicable to any use where it is desired to support a member upon springs.

It is especially applicable to vehicles of all kinds whether they run on rails as in cars or locomotives, or whether it is a vehicle running on an ordinary road or street.

In the accompanying drawing, representing embodiments of my invention, Figure 1 shows in side elevation, a semi-elliptical spring attached to a supporting member or beam. Fig. 2 is a similar elevation showing a full elliptical spring embodying my invention. Fig. 3 is a fragmentary view showing means for adjusting the tension of the pressure device. Fig. 4 shows a fragmentary view of a modification. Fig. 5 is a side elevation similar to Fig. 1 but with another form of resisting means. Fig. 6 is an enlarged section on line 6—6 indicated in Fig. 5. Fig. 7 shows a modified form of the yoke device. Fig. 8 is a section on the line 8—8 of Fig. 7. Fig. 9 is another modification of the form shown in Fig. 6. Fig. 10 is a plan of the spring shown in Fig. 9; and Figs. 11 and 12 are details of the construction shown in Fig. 5.

Referring now to Fig. 1, B indicates any desired support, and may represent the beam of a car truck, or any other suitable part of a vehicle, which is desired to be given a spring support. S denotes generally a semi-elliptical spring secured at one end of a bracket 2 to the support B and at the other end is connected therewith by link 3, whereby endwise movement or distention of the spring is permitted upon flexure thereof. The spring S is rigidly secured at its middle portion by a clamp 4 to a suitable member, such as an axle 5. The spring S is shown as composed of leaves 7, 8, 9, 10 and 11 which are of increasing length as usually constructed, and the ends of all except the top leaf 11 are free, the latter being secured to the supports 2 and 3 in the usual pivotal manner. Upon flexure of the spring, each leaf will distend and have a slight endwise movement on the adjacent leaves, which movement is greatest at their end portions. Several of the leaves are provided with means for increasing this friction between their engaging faces.

In the spring shown in Fig. 1, and also in Fig. 5, clamping is provided at the end portions of the leaf 11, whereby the three leaves 9, 10 and 11 are drawn tightly together to resist the endwise relative movement. In the construction shown in Fig. 1, yokes 12 and 13 are provided at each end, in which are pivoted levers 14 and 15 which levers extend toward the middle of the spring. In the form of Fig. 1, each lever is provided with a jaw portion 16 and 17 on opposite sides of the pivotal portion which normally engage the leaf 11. Upon swinging this lever in either direction from the normal position in which shown, one of the jaw portions will coöperate with the yoke to force the three leaves 9, 10 and 11 together. Means are provided for rocking these levers upon flexure of the spring moving it toward or from the support B. In this construction, a brace 18 is secured to the support B and pivotally connected with the levers. Upon increased weight or downward pressure upon support B the levers will have their free ends moved downward and thereby cause the jaw portions to tightly clamp the leaves together, which pressure increases as the pressure on the spring increases the flexure thereof. When from any reason, the support B moves away from the spring and axle 5, such as a sudden rebound, the levers 14 and 15 will move upward from their normal position and cause their outer jaw portions to tightly clamp the leaves together and resist the flexure of the spring. Means are provided for adjusting the pressure of the jaw members, which is shown in Fig. 3 as comprising adjustable bolts 19 and 20 on the levers 14 and 15.

In Fig. 2 is shown the application of the levers to each end of the upper and lower members of an elliptical spring. In this construction the support B² has secured thereto the elliptical spring comprising an upper member R and a lower member T, each of which consist of five leaves of varying lengths. The lower member T is secured to the axle 5 in the usual manner. In this construction there are four yokes 2', 21, 22, and 23 provided with pivoted levers 24, 25, 26 and 27 whose construction is shown as identical with that shown in Fig. 1. But the levers do not extend to the middle of the spring. The lever 24 is pivotally connected with a brace 28 secured to the support B², and a link 31 connects with the latter pivotal support and the lever 25. In the same manner the levers 27 and 26 are connected with the beam B² by a brace 30 and a link 29. From this construction it will be seen that the movement of support B² toward axle 5 to compress the spring, will rock each of the four levers and increase the friction between the leaves of each spring member at each end thereof. In the same manner the movement of support B² away from axle 5 from its normal position will also clamp the leaves more tightly together and increase the resistance of the spring to movement.

In Figs. 4 to 12 inclusive, is shown means for increasing the friction between the leaves that is carried by the springs themselves and entirely disconnected from the supporting member. One form of such construction is shown in Figs. 5 and 6. The support B is connected with axle 5 by a semi-elliptical spring S comprising the five leaves 32, 33, 34, 35 and 36. A yoke 37 surrounds the spring adjacent each end of the leaf 34, that is provided with a hook portion 38 to limit the movement of the yoke member. The yoke is provided with a bar 39 that is held in place by clamp nuts 40 on the threaded extremities of the yoke. Means for increasing the resistance is provided in this instance in the form of a resilient member. In this construction a block 41 of resilient material, such as leather or rubber is provided, and also a bearing block 42, between the resilient block and the leaf 34. The tapered form of the leaves, will serve as additional means to increase their tension in the yoke upon extension of the leaves by pressure on the spring.

A slight modification of the yoke member is shown in Figs. 7 and 8 in which there is a frame 43 provided with an adjustable bolt 44 engaging a bearing block 45. The bolt serves to clamp the blades and bearing block together, and a resilient member such as a block 46 is shown as provided in this construction. If desired the lower member 47 of the frame may be provided with an inclined face, to properly engage the tapering or wedge shaped blades.

In Fig. 9 is shown a modification of the frame member, that is composed of top and bottom members 48 and 49 that have threaded extremities with adjusting nuts 50 for moving the side members laterally to accommodate the various widths of leaves. The side members are each composed of two pivoted blocks 51 and 52 having threaded bores engaging a bolt 53 having its ends oppositely threaded, whereby rotation of the bolt will move the blocks either together or apart. In this construction the resilient member is a bowed spring 54 whose tension is adjusted by means of the bolt 55 screwing in threaded bore in the upper member 48. Instead of the hook 38, a rivet 56 may be provided as shown in Fig. 12.

A modification of the resilient clamping means is shown in Fig. 4 in which a bolt 60 is passed through a somewhat larger aperture 61 extending through four of the leaves of a spring S'. The bolt is provided with an adjusting nut 62 between which and the spring is a bowed spring 63 whose flexure will produce frictional resistance between the adjacent leaves of the spring.

Resilient means such as a block of suitable material like leather or rubber, may be used in the yokes 12 and 13, as indicated by the numeral 6 in Figs. 1, 2 and 3. But if preferred these resilient blocks may be omitted and the lever combination can be used alone for increasing the friction between the leaves of the spring.

While I have shown in the drawings several means for holding the clamping members in place on the spring after they have been adjusted as a feature for preventing the shifting in position on the spring or slipping off endwise of the clamping member, I do not wish to limit myself to these means shown, but I wish to emphasize that such fixing means, whatever they may be, should always form a part of my structure to render it most effective.

Having thus described my invention, I claim:

1. The combination with a support and a spring consisting of superposed leaves or bars endwise movable upon flexure of the spring; of mechanical means for increasing the normal friction between the contacting surfaces of the leaves upon flexure of the spring in either direction.

2. The combination with a vehicle body and a vehicle spring consisting of a plurality of superposed bars or leaves endwise movable upon flexure of the spring; of mechanical means for increasing the normal friction between the contacting surfaces of the leaves upon flexure of the spring in either direction, said means inoperative at the normal position of the body and the spring.

3. The combination with a support and a spring consisting of superposed leaves or bars endwise movable upon flexure of the spring, of resilient means connected with the vehicle body and operative to increase the normal friction between the contacting surfaces of the leaves upon flexure of the spring.

4. The combination with a vehicle body and a spring secured thereto and consisting of superposed leaves or bars endwise movable under operation of the spring, of resilient means connected with the vehicle body and operative to increase the normal friction between the contacting surfaces of the leaves at their free end portions upon flexure of the spring.

5. The combination with a support and a spring secured thereto and consisting of superposed leaves or bars endwise movable upon flexure of the spring, of resilient means connected with the vehicle body and operative to increase the normal friction between the contacting surfaces of the leaves upon flexure of the spring in either direction from its normal position.

6. The combination with a vehicle body and a spring secured thereto and consisting of superposed leaves or bars endwise movable under operation of the spring, of means connected with the vehicle body and operative to increase the friction between the contacting surfaces of the leaves at their free end portions upon flexure of the spring in either direction from its normal position.

7. The combination with a frame and a spring secured thereto and comprising a number of superposed leaves or bars, of a yoke surrounding the leaves, a lever pivotally mounted in the yoke and having a pair of jaw portions engaging the spring oppositely from where the yoke engages, whereby the swinging of the lever in either direction from its normal position will serve to force the leaves together, a resilient member between the yoke and the spring leaf and means connecting said lever with the frame whereby the flexure of the spring moving it toward or from the frame will rock said lever and force the spring leaves together.

8. The combination with a frame and a spring secured thereto and comprising a number of superposed leaves or bars, of a yoke surrounding the leaves, a lever pivotally mounted in the yoke and having a pair of jaw portions engaging the spring oppositely from where the yoke engages, whereby the swinging of the lever in either direction from its normal position will serve to force the leaves together, a resilient member between the yoke and the spring leaf, means connecting said lever with the frame whereby the flexure of the spring moving it toward or from the frame will rock said lever and force the spring leaves together, said jaw portions being adjustable.

9. The combination with a frame and a spring secured thereto, means for increasing the normal friction between the engaging faces of the leaves at their free end portions, said means being connected with the frame and actuated upon flexure of the spring.

10. The combination with a frame and a spring secured thereto, of resilient means for increasing the normal friction between the engaging faces of the leaves at their free end portions, said means being connected with the frame and actuated upon flexure of the spring, in either direction from its normal position.

11. The combination with a frame, and a semi-elliptical spring secured thereto, of yoke members surrounding the spring near its two end portions, a lever pivotally mounted in each yoke and provided with a pair of jaw portions engaging the spring oppositely from where their corresponding yoke engages whereby the swinging of the lever in either direction from its normal position will serve to force the leaves together, a resilient member between the yoke and the spring leaf, and a member connecting said levers with the frame to swing the levers and force the leaves together upon flexure of the spring toward or from the frame.

Signed at Nos. 9 to 15 Murray street, New York, N. Y., this 28th day of November, 1906.

CHARLES A. LIEB.

Witnesses:
W. H. REID,
F. E. BOYCE.